US012266247B1

(12) United States Patent
Kazi et al.

(10) Patent No.: US 12,266,247 B1
(45) Date of Patent: Apr. 1, 2025

(54) SYSTEM FOR DETECTING AND ALERTING INTRUSION INTO A PROTECTED AREA WITH A MECHANISM TO DECIPHER BETWEEN AUTHORIZED AND UNAUTHORIZED ACCESS

(71) Applicants: Tauseef Mohammad Kazi, San Diego, CA (US); Imran Khalid, La Palma, CA (US); Khalid Mahmood, La Palma, CA (US)

(72) Inventors: Tauseef Mohammad Kazi, San Diego, CA (US); Imran Khalid, La Palma, CA (US); Khalid Mahmood, La Palma, CA (US)

( * ) Notice: Subject to any disclaimer, the term of this patent is extended or adjusted under 35 U.S.C. 154(b) by 0 days.

(21) Appl. No.: 18/824,142

(22) Filed: Sep. 4, 2024

Related U.S. Application Data

(60) Provisional application No. 63/541,187, filed on Sep. 28, 2023.

(51) Int. Cl.
*G05B 19/00* (2006.01)
*G08B 13/189* (2006.01)
*G08B 27/00* (2006.01)

(52) U.S. Cl.
CPC ....... *G08B 13/1895* (2013.01); *G08B 27/006* (2013.01)

(58) Field of Classification Search
CPC .......................... G08B 13/1895; G08B 27/006
See application file for complete search history.

(56) References Cited

U.S. PATENT DOCUMENTS

| | | | | | |
|---|---|---|---|---|---|
| 4,141,610 | A | | 2/1979 | Ando | |
| 6,720,874 | B2 | | 4/2004 | Fufido et al. | |
| 8,830,060 | B2 | | 9/2014 | Pikkarainen et al. | |
| 8,907,792 | B2 | | 12/2014 | Mezger | |
| 10,698,132 | B2 | | 6/2020 | Alessi | |
| 11,462,065 | B1 | * | 10/2022 | Ogram | G07C 9/00658 |
| 2002/0017604 | A1 | | 2/2002 | Nakazaki et al. | |
| 2007/0236111 | A1 | * | 10/2007 | Gray | A47B 96/02 312/138.1 |
| 2008/0079337 | A1 | * | 4/2008 | Vardaro | A47F 3/002 312/138.1 |
| 2009/0224875 | A1 | * | 9/2009 | Rabinowitz | G07C 9/28 340/5.6 |
| 2010/0039006 | A1 | | 2/2010 | Lawrence et al. | |
| 2011/0273293 | A1 | | 11/2011 | Itkin et al. | |

(Continued)

FOREIGN PATENT DOCUMENTS

CN 112056872 A 12/2020

*Primary Examiner* — Hongmin Fan
(74) *Attorney, Agent, or Firm* — Bold IP PLLC; Binita J. Singh

(57) ABSTRACT

A theft prevention system is provided for which includes a detection mechanism configured to detect access into a protected area through an access area. Further, an output device is connected to the detection mechanism, wherein the output device takes an action when the detection mechanism detects access into the protected area. The system also includes a mechanism that differentiates between an authorized versus unauthorized access into the protected area and detects the presence of an authorized person(s) in close vicinity. Additionally, a deciphering mechanism is connected to the detection mechanism, wherein the deciphering mechanism is configured to deactivate and/or activate the detection mechanism.

15 Claims, 3 Drawing Sheets

(56) References Cited

U.S. PATENT DOCUMENTS

| | | | |
|---|---|---|---|
| 2014/0043162 A1 | 2/2014 | Siciliano et al. | |
| 2022/0067635 A1* | 3/2022 | Fawcett | G07F 9/026 |
| 2022/0166785 A1 | 5/2022 | Grant et al. | |
| 2023/0377392 A1* | 11/2023 | Creque | G07C 9/00571 |

* cited by examiner

SYSTEM FOR DETECTING AND ALERTING INTRUSION INTO A PROTECTED AREA WITH A MECHANISM TO DECIPHER BETWEEN AUTHORIZED AND UNAUTHORIZED ACCESS

CROSS-REFERENCE TO RELATED APPLICATION

This application is a non-provisional application which claims priority to U.S. Provisional Patent Application No. 63/541,187 filed on Sep. 28, 2023, which is incorporated by reference in its entirety.

TECHNICAL FIELD

The present invention relates to a system for detecting and alerting intrusion into a protected area with a mechanism for deciphering authorized versus unauthorized access.

BACKGROUND

Glass showcases, an example of a protected area, are typically used to display smaller but expensive items for sale like jewelry, watches, etc. These items are typically displayed in the glass showcase on small, velvet-lined trays or stands that can be arranged on shelves or in compartments within the cabinet. Customers are on the outer side of the showcase while salespersons are on the inner side. A showcase has doors on the inner side which can be opened to place the items in or to be taken out by the salesperson. The outer side does not have the doors. The doors have locks but usually these are unlocked during normal operation of the store for convenience to avoid having to open and close frequently.

Although there are no doors on the outer side, if the salesperson is not watching, a customer standing on the outer side can extend his/her arm, reach out to the inside doors, into the showcase and take items out without being noticed, detected, or caught. This practice is commonly used by thieves to steal expensive items from showcases.

Previous technologies have attempted to solve this problem. One such solution for preventing unauthorized access into glass showcases uses doors on the inside which can be closed and locked. Locking the doors does prevent customers from reaching into the showcase but it is inconvenient and impractical for the salesperson to keep opening and closing the locks, especially when there are many showcases, and the shop is busy with customers. For this reason, locks are left open during normal operation of the shop and the jewelry is removed from the showcases and placed in safes when the shop is closed.

Another solution is to have showcases that are unbreakable. These are good to protect the shelves from burglars and robbers but do not solve the problem to prevent an amateur customer or the thief from reaching inside the showcase during normal business hours.

Another solution is what gets deployed in large museums and display-only exhibitions to detect intruders from stealing expensive items that are displayed. This perhaps can be deployed after hours but does not solve the problem during business hours when the store is open, has items for sale, and requires the salesperson to constantly remove and return the expensive items in the showcase.

There are devices to detect if the sliding door was opened. Also, there are wired or wireless devices that are attached to the items on display, e.g., on cellphones or cameras for sale, which prevents them to be removed or moved far from their cradle. None of these detect a person's hand reaching inside a glass showcase.

Also, there are alarm systems which use RFIDs assigned to the authorized individuals to disable the alarm. This works, but covers a large area, and assumes that the presence of just one individual is enough to monitor the full area. This may not be true if there are many shelves in close-proximity and if the salesperson gets busy with a customer on one side of the area, leaving shelves on the other side vulnerable.

Accordingly, there is still an unsolved need for a system that addresses these problems discussed above and may address other existing issues.

SUMMARY

The disclosed system is unique when compared with other known systems and solutions. The disclosed system detects authorized or unauthorized access by owners or intruders, from the inner and/or outer side into the protected area of a showcase and generates an alarming or nonalarming alert upon detection while its detection system is activated. A mechanism is in place to disable the alert or to change the alert type if an authorized person, such as a shop owner or a salesperson, reaches into the protected area rather than an unauthorized person reaching into the protected area.

In one or more embodiments, a system for detecting and alerting intrusion into a protected area with a mechanism to decipher between authorized and unauthorized access is described herein. The system includes a mechanism to detect and alert an attempted access into a protected area. The system further includes a device that takes action when such an access is detected. The system includes a mechanism capable of deciphering between an authorized versus an unauthorized access. Additionally, the system will include an audible/visual signal to notify and/or warn when the system is activated and/or deactivated. These can include panel display lights, on/off switches, warning signs, an automatic and possibly artificial intelligence (AI) driven messaging system, alternative messaging system such as text messages, etc.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
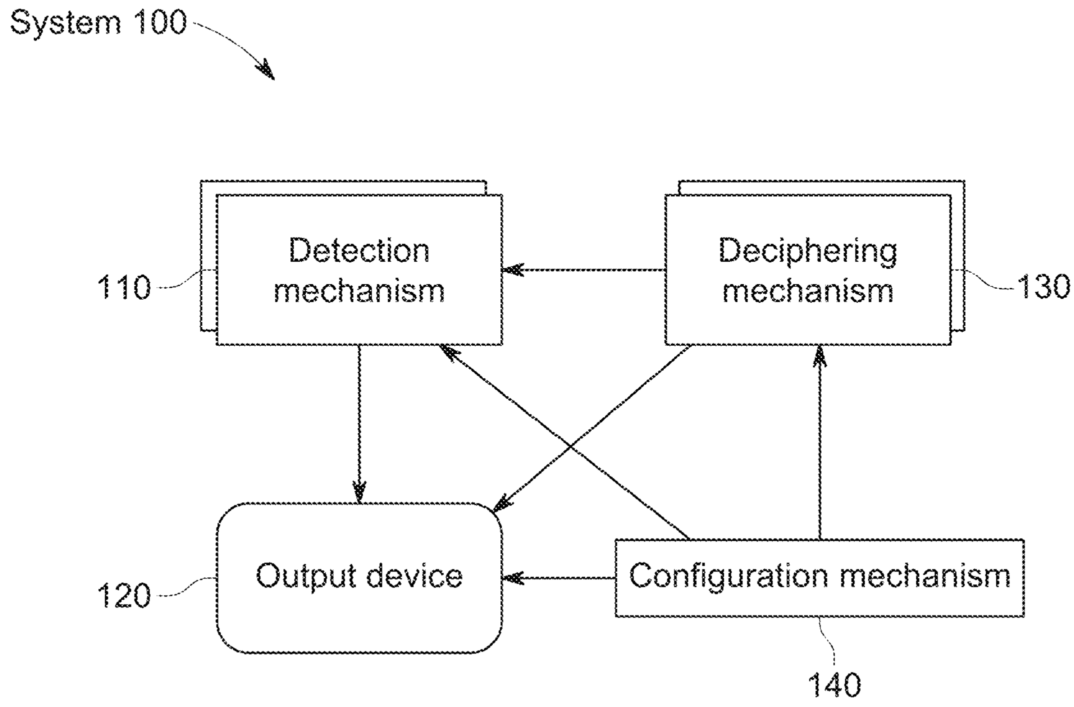
FIG. 1 is a block diagram illustrating the components comprising a system for detecting intrusion or unauthorized access into a protected area.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Referring now to the drawings and the following written description of the present invention, it will be readily understood by those persons skilled in the art that the present invention is susceptible to broad utility and application. Many embodiments and adaptations of the present invention other than those described herein, as well as many variations, modifications, and equivalent arrangements will be apparent from or reasonably suggested by the present invention and the detailed description thereof without departing from the substance or scope of the present invention. This disclosure is only illustrative and exemplary of the present invention and is made merely for purposes of providing a full and enabling disclosure of the invention.

The present disclosure is generally directed to one or more non-limiting embodiments of a system that can be used as a theft prevention system for use with display cases, which will be referred to as the system herein. The system provides an easy and efficient way of detecting access with a disablement mechanism for authorized personnel.

FIG. 1 illustrates details relating to a non-limiting embodiment of a system 100, which is an example of a system that can be used as a theft prevention system for a protected area, such as a display case. The following description continues with the example of a theft prevention system being used in a display case. It is to be understood that the theft prevention system can be used in other areas sought to be protected from unauthorized access. The system 100 described in this embodiment simplifies the configuration process and eliminates the need to lock the display cases. As is further described in detail below, the disclosed system 100 relates to a simplified method for configuring a monitoring zone that can be easily and quickly reconfigured by the presence of an authorized person, automatically or manually. As mentioned previously, the description of the system in use with a display case is merely intended to provide an example environment of use and is not meant to be limiting. One having ordinary skill in the art will understand that the same principles may be applied to different environments without departing from the core of the disclosed system.

FIG. 1 is an example setup of the system 100 that can be used to create a monitoring zone for detecting access with a deciphering mechanism to decipher authorized or unauthorized access. The system 100 includes one or more mechanisms to detect intrusion into a display case shelf (detection mechanisms 110), a device that takes an action when intrusion is detected (output device 120), and one or more mechanisms to decipher between an authorized vs an unauthorized intrusion (deciphering mechanisms 130). A configuration mechanism 140 is also included in the system 100. The configuration mechanism 140 is a mechanism that configures each of the other three components of the system 100. It selects the different options that will be articulated below for each of the other three mechanism 110, 120, and 130. The detection mechanism 110, output device 120, and deciphering mechanism 130 are discussed as separate devices or mechanisms, however, in some embodiments, the devices and/or mechanisms may all be combined in one or more devices. Regardless, all devices and mechanisms discussed are part of the system 100 in one form or another.

Figure 2:
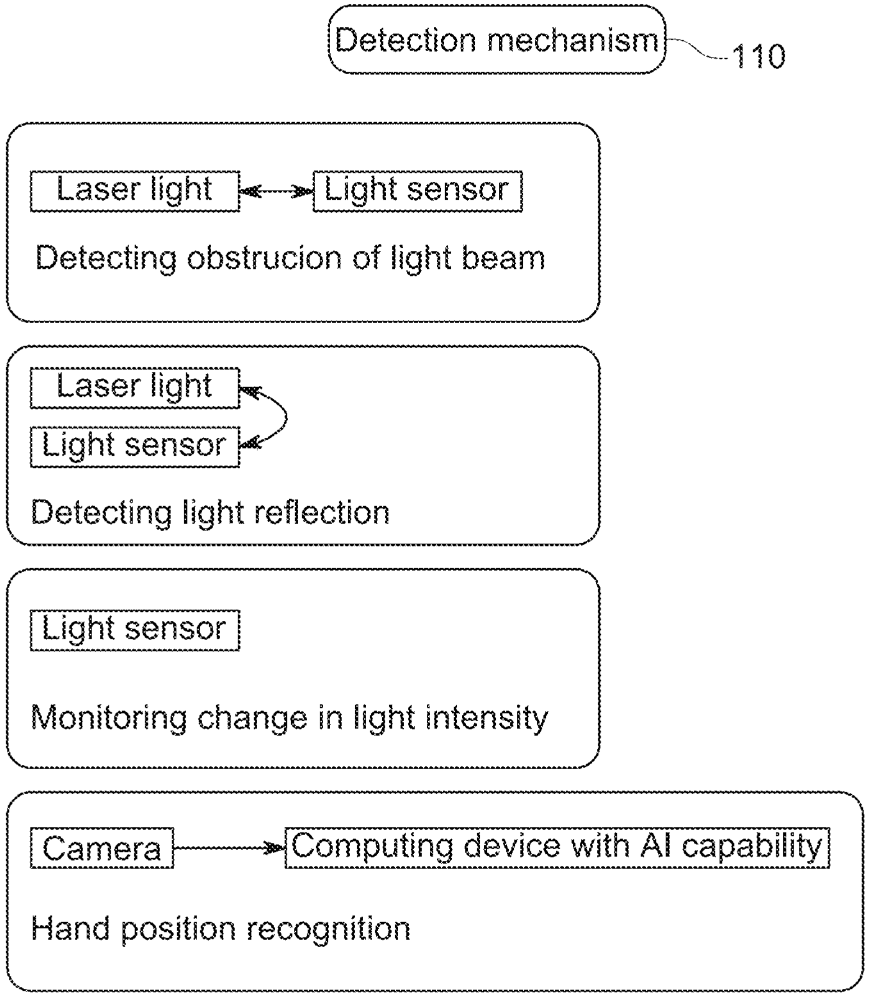
FIG. 2 is a block diagram illustrating some example mechanisms of a detection mechanism comprising the system from FIG. 1.
Figure 3:
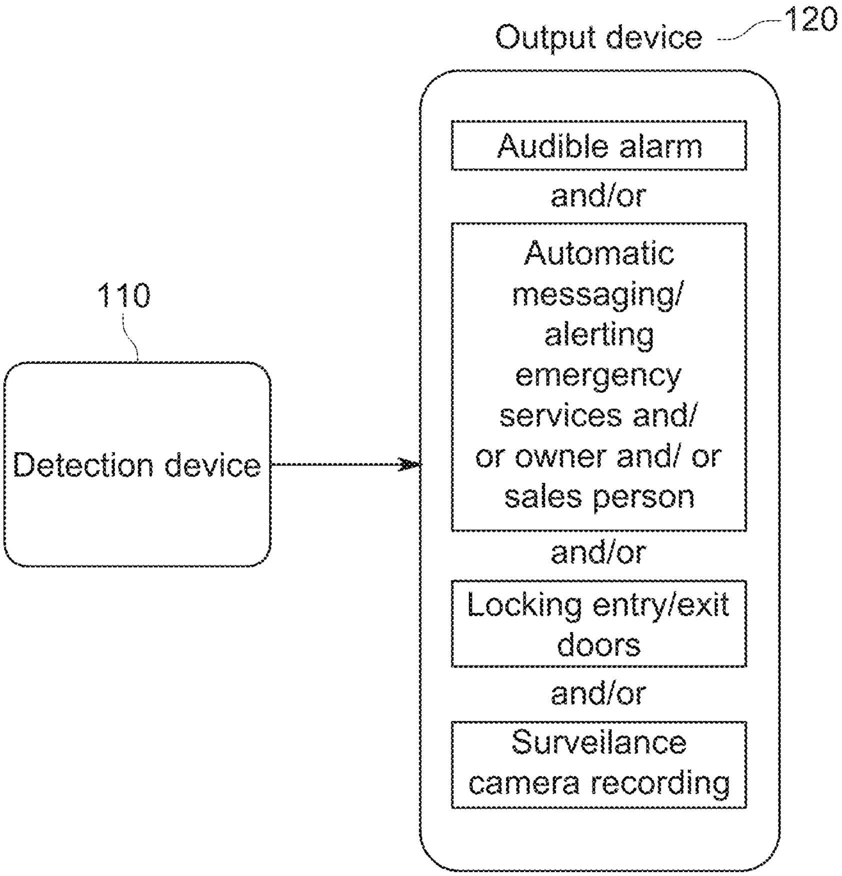
FIG. 3 is a block diagram illustrating some examples of an output device comprising the system from FIG. 1.

Referring to FIG. 2, the detection mechanism 110 to detect intrusion into a shelf may be accomplished in several ways. The detection mechanism 110 may include a light source inside one end of the shelf and a light sensor inside the opposite end which can be used to detect intrusion into the shelf. The light source may be positioned inside or outside of a display case opening. The light source may include a laser or non-laser mode to detect intrusion. Intrusion is detected whenever the light is obstructed. Obstruction of the light can occur when a hand or some other object reaches through the display case opening obstructing a light path from the light source to the light sensor. To this end, the light sensor can be connected to the device that takes an action 120 when the obstruction is detected.

Another mechanism to detect intrusion 110 may include a combo device that has both the light source (laser or non-laser convention) and light sensor that can be placed inside one end of the shelf. That is the light source and light sensor are positioned on the same side such that the intrusion is detected when the light from the light source is reflected to the light sensor off an intruding object, such as from an intruder's hand.

Another detection mechanism 110 may include a simple light sensor inside the showcase that can detect an intrusion just by monitoring the changes in light intensity of light sources outside the showcase when some foreign object enters inside the shelf.

Yet another mechanism to detect intrusion 110 may include a camera connected to a computing device which is capable of recognizing hand positioning, i.e., a hand positioned from behind the counter or a hand reaching from above the display case. In this embodiment, a computing device would be employed with a computer-vision based machine learning capable of recognizing hand positioning.

The camera may be positioned inside the shelf to detect the presence of foreign objects and intruding hands much more effectively. The camera may be connected to a computing device via a wired network or a wireless network.

It is to be understood that in either of these examples, the detection mechanism 110 may be connected to the output device 120 that takes an action to alert that an intrusion in the protected area has occurred. The output device 120 may be wired to or wirelessly connected to one or more detection mechanisms 110, each with its own unique identification (ID). The output device 120 takes an action when intrusion is detected via any of the above-described detection mechanisms. A unique action is taken for each unique detection mechanism based on its unique ID, and based on the deciphering mechanism input, whether it was an authorized or an unauthorized access. The output device 120 can be any type of device that outputs a corresponding intrusion signal, along with an indicator, indicating the ID of the detection mechanism that was intruded. One such example of the output device 120 can include a device that sounds an audible alarm upon detecting an intrusion, the tone of the alarm could be based on the ID of the intruding mechanism, and based on the deciphering mechanism input, whether it was an authorized or an unauthorized access. Another example of the output device 120 can include a device that sounds an audible alarm and may also display information on a display panel, upon detecting an intrusion, the tone of the alarm and/or the display output could be based on the deciphering mechanism input, whether it was an authorized or an unauthorized access and/or the ID of the intruding mechanism. Another example can be a device that sends a signal to a phone. The signal can be a text message and/or a call to an emergency line, a security guard, and/or an owner. The message itself may include the ID of the detection mechanism and can use AI capabilities to determine the best signaling method. Another example of the output device 120 would include a mechanism that locks the doors into and out of an establishment wherein the sales counter with the system is located so the intruder cannot escape the premises. Yet another example of the output device 120 may include a surveillance camera that is activated to record the critical scenes after a detected intrusion. The position of the intrusion would be known from where the signal is received from based on the ID of the detection mechanism, and thus the surveillance camera can be oriented and focused on that scene.

The deciphering mechanism 130 is connected to the corresponding detection mechanism 110 deciphering between authorized and unauthorized access. The deciphering mechanism 130 can signal to the output device 120 whether the access into a protected area is authorized or not. To reiterate, the deciphering mechanism 130 detects whether the access into the protected area is authorized or unauthorized. It then passes this information to the output mechanism 120 which subsequently generates either a non-alarming or an alarming response, respectively. The non-alarming response is related to the authorized access. One of the non-alarming responses is to not generate any alert on an authorized access. Basically, it can indicate an authorized access alert and allow access into the protected area without generating an alarming alert through the output device 120. The alarming response is related to an unauthorized access. Several examples of a deciphering mechanism 130 are provided below to demonstrate the various ways such can be achieved.

In one example, a switch may be accessible only to authorized personnel allowing them to alert the detection mechanism 110 which is deciphered by the deciphering mechanism 130, signaling the output device 120 of an authorized access alert. An authorized person alerts the detection mechanism 110 before accessing items inside the shelves. The switch may be a simple on and off switch such that the authorized personnel can manually flip the switch before accessing the protected area to indicate an authorized access to the deciphering mechanism. The authorized personnel will flip the switch back after completing the access into the protected area. In alternate embodiments, a timer may be included with the switch which can automatically flip the switch back after some delay. Once the switch is flipped back, all accesses will be deciphered as unauthorized by the deciphering mechanism.

In another example, a foot pedal switch may be used to alert the detection mechanism 110 indicating an authorized access alert by authorized personnel (accessible only to authorized personnel). The foot pedal may be placed along the ground on the inner side of the showcase and in the vicinity of the associated shelf making it accessible to authorized personnel accessing the shelf. The authorized personnel can step on the pedal before accessing items inside the shelf or shelves to indicate an authorized access to the deciphering mechanism. All accesses into the protected area are deciphered as authorized while the foot pedal is being stepped on. Once the authorized person steps off the foot pedal all current and/or succeeding accesses are deciphered as unauthorized by the deciphering mechanism. In alternate embodiments, a timer may be included with the foot pedal which can add a delay after the authorized person has stepped off the foot pedal before unauthorized accesses are deciphered.

In another example, a non-intrusive automated mechanism may be employed. This may be achieved in several ways. One or more sensors may be positioned in an area where only authorized personnel would be allowed, such that a presence of authorized personnel at the counter would activate the one or more sensors which subsequently makes deciphering mechanism 120 to categorize all accesses as authorized accesses. Once the authorized person moves away from a monitoring zone of the one or more sensors, the deciphering mechanism 120 categorizes all accesses as unauthorized accesses.

In the example system that uses AI cameras with hand recognition capability, the system may automatically detect if the intrusion is from an authorized or an unauthorized person.

In yet another example, the system 100 may also be configured using RFID, which can be used to differentiate between authorized and unauthorized access into the showcase. As an example, an authorized person may use a key card that alerts the detection mechanism 110 of an authorized access when the key card is in the appropriate vicinity of the deciphering mechanism 130. When the authorized person moves away from the detection mechanism 110, the detection mechanism 110 is not receiving the alert that the authorized person is in the vicinity.

In yet another example, the system 100 may also be configured using a mobile phone's short-range wireless connectivity such as Bluetooth, NFC, etc., which can be used to differentiate between authorized and unauthorized access into the protected area. As an example, an authorized person's mobile phone that is linked to the deciphering mechanism 130 using Bluetooth, will alert the detection mechanism 110 of an authorized access alert when the authorized person carrying the linked phone is in the appropriate vicinity/range of the deciphering mechanism 130.

When the authorized person with this linked phone moves away from the deciphering mechanism 130, subsequent accesses will be categorized as unauthorized.

Accordingly, the present description provides for various embodiments for a system 100 that can be used with display cases, such as at a sales counter, to prevent customers or other unauthorized persons from reaching over the counter into the display case by alerting an authorized person. Further, the system 100 also provides an easy and efficient way to indicate an authorized access alert when a salesperson or other authorized person reaches into the display case. The system 100 described herein includes various mechanisms to achieve the above purpose.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A theft prevention system comprising:

one or more detection mechanisms configured to detect access into one or more protected areas, wherein each protected area of the one or more protected areas includes a detection mechanism of the one or more detection mechanism, and wherein each detection mechanism of the one or more detection mechanisms has a unique identification;

a deciphering mechanism connected to the one or more detection mechanisms, wherein the deciphering mechanism differentiates between an authorized versus unauthorized access into any of the one or more protected areas, wherein the deciphering mechanism is configured to indicate authorized or unauthorized access to one or more detection mechanisms by using the unique identification of the one or more detection mechanisms; and an output device connected to the one or more detection mechanisms, wherein the output device takes a unique action for each unique identification when any of the one or more detection mechanisms detect access into the one or more protected areas.

2. The theft prevention system of claim 1, wherein a configuration mechanism articulates a response of each of the one or more detection mechanisms, a response of the deciphering mechanism, and a response of the output device based on the different option responses available for each of the one or more detection mechanisms, the deciphering mechanism, and the output device.

3. The theft prevention system of claim 1, wherein the one or more detection mechanisms include a light source in direct communication with a light sensor, wherein access into the one or more protected areas is detected when the communication is obstructed, and wherein:

the light source includes a laser or non-laser mode to detect an intrusion.

4. The theft prevention system of claim 1, wherein the light source and the light sensor are on opposing ends such that the light source directs a light beam along a direct path to the light sensor.

5. The theft prevention system of claim 1, wherein the one or more detection mechanisms include a light source and a light sensor positioned in relation to each other such that an intrusion into the one or more protected areas is detected when light from the light source is reflected off an intruding object into the light sensor.

6. The theft prevention system of claim 1, wherein the one or more detection mechanisms include a camera connected to a computing device through a wired and/or wireless network, wherein the computing device employs a computer-vision based machine learning capable of recognizing authorized individuals, wherein:

the camera is positioned to detect a presence in the one or more protected area.

7. The theft prevention system of claim 6, wherein alternatively the computing device is capable of recognizing hand positioning, wherein:

the camera is positioned in the one or more protected areas such as to detect the presence of a hand reaching from outside the one or more protected areas.

8. The theft prevention system of claim 1, wherein the output device includes a device capable of emitting an intrusion signal, where the output device includes any device capable of sounding an audible alarm, sending a signal to a computing device, sending a signal to a phone, sending a signal to a device that locks access into and/or out of the one or more protected areas, and/or sending a signal to a connected surveillance camera device to record a scene the camera is focused on.

9. The theft prevention system of claim 8, wherein the signal to the phone includes a phone call and/or text message to an emergency line, a security guard, and/or an owner.

10. The theft prevention system of claim 1, wherein the deciphering mechanism enables the theft prevention system to deactivate the one or more detection mechanisms and/or indicate an authorized access alert through the output device, allowing access into the one or more protected areas without generating an alarming alert through the output device.

11. The theft prevention system or claim 1, wherein the deciphering mechanism is a switch to turn off the one or more detection mechanisms, wherein the switch is accessible to an authorized person.

12. The theft prevention system of claim 11, wherein the switch is an on and off switch that manually reactivates the one or more detection mechanisms or alternatively, the switch includes a timer to automatically reenable the one or more detection mechanisms after a set amount of time.

13. The theft prevention system of claim 1, wherein one or more sensors are positioned in the one or more protected areas such that a presence of an authorized person in the one or more protected areas activates the one or more sensors which subsequently disables a detection mechanism of the one or more detection mechanisms in the one or more protected areas having the presence of the authorized person, wherein when the authorized person moves away from a monitoring zone of the one or more sensors, the detection mechanism of the one or more detection mechanisms in the one or more protected areas is reactivated.

14. The theft prevention system of claim 1, wherein a RFID device is used by one or more of the deciphering mechanisms to differentiate between authorized and unauthorized access into the one or more protected areas, wherein the one or more detection mechanisms are deactivated and/or an authorized access alert is generated, allowing access into the one or more protected areas without generating an alarming alert through the output device when the RFID device is in a detection range of the deciphering mechanism in the one or more protected areas;

the one or more detection mechanisms is reactivated and/or an unauthorized access alert is generated, disallowing access into the one or more protected areas while generating an alarming alert through the output device when the RFID device is not within the detection range of the deciphering mechanism in the one or more protected areas.

15. The theft prevention system of claim 1, wherein a mobile phone of an authorized person(s) is linked to the deciphering mechanism using short range wireless connectivity such that the one or more detection mechanisms is deactivated and/or an authorized access alert is generated, allowing access into the one or more protected areas without generating an alarming alert through the output device when the mobile phone is in a range of the deciphering mechanism, wherein, when the mobile phone is not within the range of the deciphering mechanism, the one or more detection mechanisms is reactivated and/or an unauthorized access alert is generated, disallowing access into the one or more protected areas while generating an alarming alert through the output device.

* * * * *